United States Patent
Schiller et al.

(10) Patent No.: US 8,371,510 B2
(45) Date of Patent: Feb. 12, 2013

(54) DISPLAY MODULE AND DATA STORAGE MEDIUM WITH AN INSERTED DISPLAY MODULE

(75) Inventors: Christoph Schiller, München (DE); Thomas Tarantino, Laufen (DE); Hans Graf, Dornbirn (AT); Stefan Kluge, München (DE); Michael Stegmüller, Dachau (DE); Manuela Schröpf, München (DE)

(73) Assignee: Giesecke & Devrient GmbH, Munich (DE)

( * ) Notice: Subject to any disclaimer, the term of this patent is extended or adjusted under 35 U.S.C. 154(b) by 220 days.

(21) Appl. No.: 12/745,770

(22) PCT Filed: Dec. 4, 2008

(86) PCT No.: PCT/EP2008/010311
§ 371 (c)(1),
(2), (4) Date: Jun. 2, 2010

(87) PCT Pub. No.: WO2009/071305
PCT Pub. Date: Jun. 11, 2009

(65) Prior Publication Data
US 2010/0252639 A1    Oct. 7, 2010

(30) Foreign Application Priority Data
Dec. 5, 2007   (DE) .......................... 10 2007 058 547

(51) Int. Cl.
*G06K 19/06*   (2006.01)
(52) U.S. Cl. ......... 235/492; 235/380; 235/375; 235/487

(58) Field of Classification Search .................. 235/492, 235/380, 451, 487, 375
See application file for complete search history.

(56) References Cited

U.S. PATENT DOCUMENTS

| | | | |
|---|---|---|---|
| 6,065,681 A | 5/2000 | Trueggelmann | |
| 2005/0045729 A1* | 3/2005 | Yamazaki | 235/492 |

FOREIGN PATENT DOCUMENTS

| | | |
|---|---|---|
| DE | 197 03 122 C1 | 5/1998 |
| DE | 195 00 925 C2 | 4/1999 |
| DE | 199 42 932 A1 | 3/2001 |
| DE | 102 10 606 A1 | 10/2003 |
| DE | 102 48 383 A1 | 5/2004 |
| DE | 103 24 043 A1 | 12/2004 |
| EP | 1 411 467 A1 | 4/2004 |
| FR | 2 776 796 A | 10/1999 |

OTHER PUBLICATIONS

International Search Report in PCT/EP2008/010311, Apr. 7, 2009.

* cited by examiner

Primary Examiner — Edwyn Labaze
(74) Attorney, Agent, or Firm — Bacon & Thomas, PLLC

(57) ABSTRACT

A module for insertion into a data carrier body to form a data carrier, the module having a contact interface with a contact area, at least one integrated circuit and a display device with a display area which are interconnected. Method for producing the module, the data carrier body and the data carrier. The contact interface and the display device of the module are disposable in the data carrier body such that the contact area of the contact interface and the display area of the display device point in opposite directions. The data carrier body thus possesses a through opening into which the module is insertable as described.

44 Claims, 5 Drawing Sheets

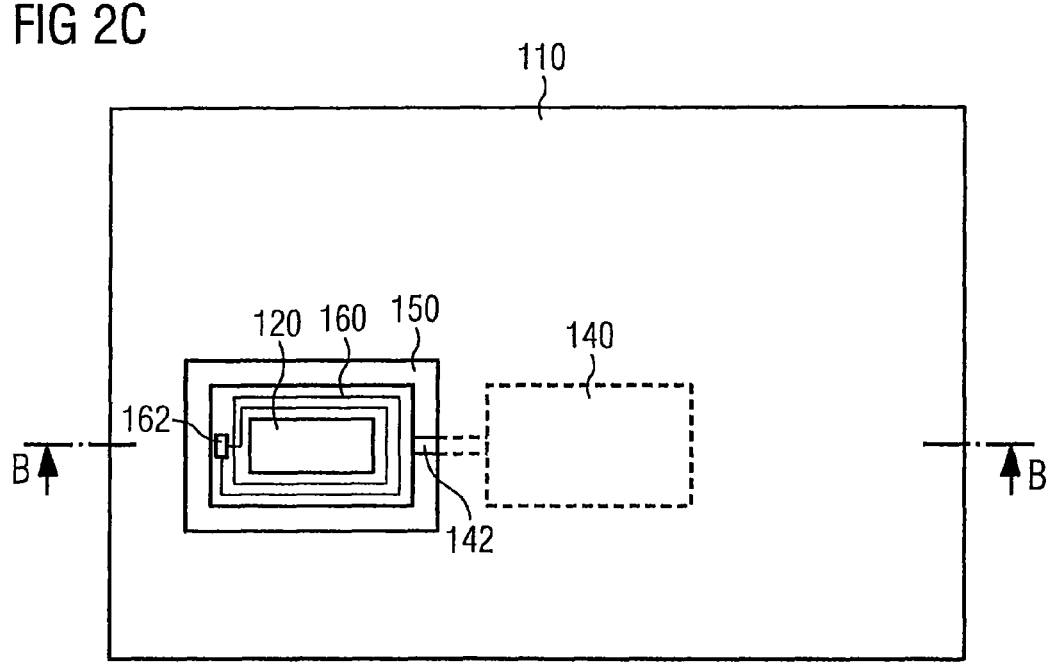
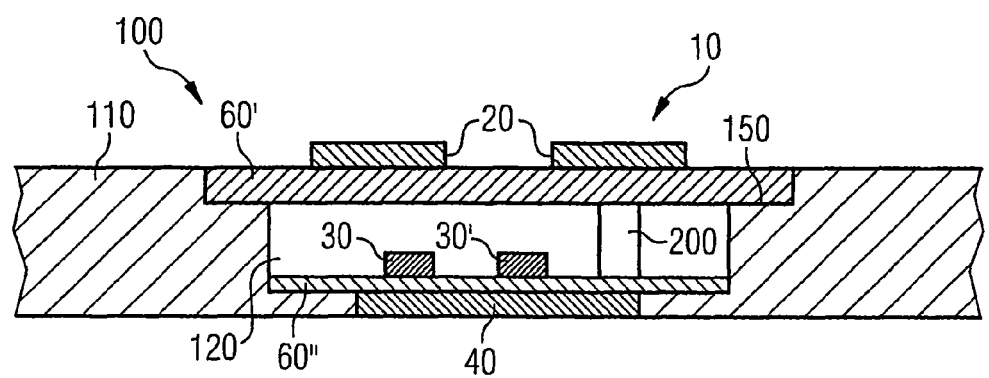

DISPLAY MODULE AND DATA STORAGE MEDIUM WITH AN INSERTED DISPLAY MODULE

FIELD OF THE INVENTION

The present invention relates to a module comprising a contact interface, an integrated circuit and a display, and to a portable data carrier having such a module. The invention relates further to a method for producing a corresponding module and a corresponding data carrier.

BACKGROUND

Portable data carriers, in particular in the form of chip cards, key pendants or card tokens, having a display are used as identification cards, credit cards, telephone cards or the like, and as so-called "electronic purses" for cashless payments.

It has been found that a construction of chip cards having a display by the multi-layer process, by which a plurality of layers of plastic foils are joined into a card body under pressure and heat, is technically elaborate and cost-intensive. The functional layers of the display must be inserted into the particular layers during the production process and are therefore subjected to a high pressure load which can already damage or even destroy the display during production.

DE 102 10 606 A1 describes a display module wherein a control chip module is contacted directly onto a display substrate. The control chip module comprises the control electronics for controlling the individual elements of the display. The control chip is contacted on a conducting path arrangement and protected from environmental influences and mechanical stresses by a potting compound. The display module can be configured as a cartridge which can be inserted into the chip card and removed therefrom by a user. A device for electronically contacting an integrated circuit of the chip card to the display module must be provided separately in the chip card.

EP 1 411 467 A1 describes a chip card possessing outside a main bending line of the chip card a common cavity for a chip module and a display, the chip module comprising a contact interface and an integrated circuit contacted thereto. The chip module and the display are electronically interconnected and can be cast into a uniform module which is then inserted into the common cavity of the chip card as one component. The electronic contacting of display and integrated circuit is already configured in the uniform module. Because of its spatial extension, primarily the uniform module into which chip module and display are cast, despite being disposed outside the main bending line of the chip card, is still susceptible to damage by bending loads acting on the chip card.

SUMMARY

Therefore, it is the object of the present invention to propose a method for cost-efficiently producing a robust portable data carrier having a display, and to state a suitable module having a display and a suitable data carrier.

This object is achieved by a module, a data carrier body and a data carrier, and by methods for producing the module, the data carrier body and the data carrier, having the features of the independent claims. Advantageous embodiments and developments are stated in the dependent claims.

Thus, an inventive module for insertion into a data carrier body comprises a contact interface with a contact area, at least one integrated circuit and a display device with a display area, wherein the contact interface, the at least one circuit and the display device are interconnected. According to the invention, the contact interface and the display device are disposable in the data carrier body such that the contact area of the contact interface and the display area of the display device point in opposite directions. The contact interface, the at least one circuit and the display device can be interconnected into the module in diverse ways, whereby the connection can be of a mechanical and/or electronic nature, it being essential only that these single components of the module are no longer present separately.

Regarding the contact interface, it is alternatively possible that it has no contact areas on the card surface. Instead of the contact area, a cover plate can be present. Thus, the module can be placed on or in the card at will. If the contact interface has contact areas, then the module must be placed in the position that is given by a standard, e.g. ISO 7816.

An inventive flat data carrier body for receiving an inventive module thus possesses a through opening or a cavity into which the module is insertable such that the contact interface and the display device are disposed on opposing sides of the data carrier body, and the contact area of the contact interface and the display area of the display device of an inserted module point in opposite directions.

Accordingly, an inventive portable data carrier comprises an inventive data carrier body and an inventive module inserted into the through opening of the data carrier body such that the contact interface and the display device are disposed on opposing sides of the data carrier body, and the contact area of the contact interface and the display area of the display device point in opposite directions.

In an inventive method for producing the module, the contact interface, the at least one integrated circuit and the display device are thus interconnected into a module which is disposable in the data carrier body such that the contact area of the contact interface and the display area of the display device point in opposite directions. It is possible, on the one hand, that before insertion into the opening of the data carrier body the module already has a fixed, defined form according to which the display device and the contact interface are disposed on opposing sides of the module. On the other hand, it is possible that the single components of the module are connected flexibly or movably and the opposing sides of the module are only defined through insertion of the module into the opening of the data carrier body. That is, before insertion of the module into the opening the module possesses a variable, changeable form but permitting the module to be inserted into the opening of the data carrier body in such a manner that the contact interface and the display device are disposed on opposing sides of the data carrier body, and the contact area of the contact interface and the display area of the display device point in opposite directions.

In an inventive method for producing the data carrier body for receiving the contact interface, the at least one integrated circuit and the display device in the opening of the data carrier body, the opening is configured as a through opening extending completely through the data carrier body such that the contact interface and the display device are disposable on opposing sides of the data carrier body, and the contact area of the disposed contact interface and the display area of the disposed display device then point in opposite directions.

In an inventive method for producing the data carrier, an inventive flat data carrier body with a through opening, as well as a contact interface, at least one integrated circuit and a display device is [sic] supplied. The contact interface, the at least one integrated circuit and the display device are then interconnected and disposed in the opening of the data carrier body such that the contact interface and the display device are so disposed on opposing sides of the data carrier body that the contact area of the contact interface and the display area of the display device point in opposite directions.

Using the described methods, a robust portable data carrier having a display device can be produced in an effective and cost-efficient manner. The configuration of the module permits the described advantageous arrangement of the components in the opening of the data carrier body. Thus, the components are well protected from compressive and bending loads, because the module inserted into the opening of the data carrier body assumes a very compact form. Sensitive components are hidden inside the data carrier body, and the extension of the module over the surface is minimized. In this manner it is above all possible to minimize the effects of bending loads on the module. The module can be put together from standard components or special components, and be produced as a half-product independently of the data carrier body. The same holds for the data carrier body. The described arrangement of display device and contact interface on opposing sides of the data carrier body moreover permits the display area of the display device to be read easily while the data carrier is being contacted by an accordingly adapted contact reading device via the contact interface.

According to a first embodiment, the module is configured as a flexible circuit board on which the contact interface, the at least one integrated circuit and the display device are disposed and electronically interconnected. On account of the flexible form of the module, it can be employed for insertion into different data carrier bodies, the final form of the module only being defined upon insertion.

It is also possible to fill in the module by means of a potting material such that the contact interface and the display device are disposed on mutually opposing sides of the potted module such that the module can be inserted into the data carrier body in the above-described manner. The module is thus given its defined form and can be inserted into an accordingly shaped opening of a data carrier body in a simple way. Such a shaping of the module can also be obtained by suitable gluing or soldering of the circuit board.

According to a second embodiment, the module comprises two circuit boards which are electronically interconnected. On the first circuit board there is disposed the contact interface, on the second circuit board the display device. In this manner it is possible to produce the module from standard components which then only need to be suitably interconnected electronically.

The module can contain exactly one integrated circuit which is then disposed on the first circuit board when there are employed e.g. a standard chip module with a contact interface and/or a contactless interface and an integrated circuit contacted to said interface and potted therewith on a first circuit board, and a usual display as a display device on a second circuit board, the display being controlled via the one integrated circuit of the chip module. As a contactless interface, an antenna could also be integrated on one or both circuit boards.

On the other hand, the module can also comprise at least two integrated circuits, for example additionally a separate one for controlling the display device, and/or a crypto chip or the like. The circuits can be disposed both on the first circuit board and on the second circuit board, or exclusively on one of the two circuit boards. In such a configuration it is possible to adapt a module to the special requirements of a data carrier to be produced.

Besides the integrated circuits, additional passive components, such as capacitors, can also be located on one or both circuit boards.

The two circuit boards can be interconnected electronically in diverse ways, for example by means of an anisotropic contact strip contacting the two circuit boards. It is also possible to connect a wire grid to the two circuit boards, for example by soldering, gluing or welding, in which case the wire grid produces the electronic connection between the two circuit boards. The wire grid consists of at least two wires disposed parallel to each other which do not touch each other. Finally, the two circuit boards can be connected electronically by means of bonding wires.

Other ways of connecting the two circuit boards are likewise possible. At least one of the two circuit boards can be configured as a flexible circuit board. Said flexible circuit board can then be connected to the other circuit board electronically and/or mechanically by means of soldering, gluing or welding or in another suitable manner.

The integrated circuits in the module are normally protected from possibly damaging incident light by being disposed between the contact interface and the display device in the module. In the cases where the circuits are disposed in another place, e.g. on the same side of a circuit board as the display device and beside the same, or on the side of the circuit board opposite the display device but not covered by the display device, the circuits can be protected from incident light by additional devices. It is e.g. possible to pot the circuits by means of a light-protective potting material or to cover the circuit board in the corresponding place on the side opposite the circuits with a light-protective layer, e.g. a thin copper layer.

According to an advantageous configuration, potting material is disposed in the module such that the first circuit board and the second circuit board are disposable in the data carrier body so as to be spaced apart and/or disposed spatially relative to each other. That is, the potting material does not necessarily determine the final form of the module as long as the latter is not inserted into the opening of the data carrier body, but has a shaping effect on the module only at the moment when the module is actually inserted into the opening. It is e.g. possible to pot the particular side of the first and/or second circuit board opposing the contact interface or the display device with potting material and to form the latter so as to be suitably plane. Besides protecting the possibly potted integrated circuits disposed on the particular circuit boards, it is thus possible to space apart the two circuit boards upon insertion into the opening of the data carrier body by the particular potting materials abutting each other or a potting material on one circuit board abutting the unpotted other circuit board. The module thus, when it is inserted into the opening, attains substantially the same thickness as the data carrier body.

To give the module its final form before insertion into the opening of the data carrier body, the potting material can be accordingly shaped in the module and connected to the components in the module. It is e.g. possible to glue together the two hereinabove described potted sides of the two circuit boards, or to glue an unpotted circuit board to the potting material on the other, potted circuit board. The unpotted circuit board is preferably configured flexibly, so that it can adapt to the form of the potting material on the other circuit board.

According to an advantageous configuration, the potting material in a potted module or in a module disposed in the data carrier body between the contact interface and the display device is stepped. Accordingly, the through opening in the data carrier body is likewise stepped complementary thereto. In this manner the fixing of the module in the opening is facilitated when the module is e.g. glued into the opening. The steps can serve as gluing surfaces.

In the data carrier body a contactless interface, e.g. in the form of an antenna coil, can additionally be applied, for example printed, on one of the steps. The module then possesses on one of the circuit boards at least one contact for contacting the contactless interface upon insertion of the module into the opening of the data carrier body. A circuit of the module can thus also communicate contactlessly with a corresponding reading device, making the data carrier a dual-interface data carrier. If the contact areas are absent at the position of a standard, e.g. ISO 7816, then the data carrier does not become a dual-interface data carrier because then only a contactless interface is present.

The module can further comprise an input device, e.g. a button, for manually inputting data. The input device is connected electronically to the at least one circuit and the display device, and the input device and the display device are disposable in the data carrier body such that the input device and the display area of the display device point in the same or in different directions. By actuating the input device a user of the data carrier can initiate a functionality of the data carrier, e.g. the generation of a one-time password. It is then expedient that the display device can be seen at the same time, e.g. for reading the generated one-time password, without having to turn over the data carrier for this purpose.

Preferably, the module comprises contacts on one of the circuit boards for contacting battery connectors of a battery preferably integrated into the data carrier body, the connectors of the battery protruding into the through opening of the data carrier body. In this manner the integrated circuits and the display device and other electronic units, e.g. a finger sensor, can also be operated via the battery independently of a reading device which can supply the data carrier with energy.

In the method for producing the data carrier, it is possible to insert the contact interface, the at least one circuit and the display device into the opening of the data carrier body as described in the form of a hereinabove described module, i.e. in particular that said single components are connected before being disposed in the opening of the data carrier body. It is likewise possible that a single component, for example a display device disposed on a circuit board, is first disposed in the opening and only then connected to another single component, e.g. a chip module having a contact interface and disposed on another circuit board, after which the other single component is finally also disposed in the opening. In this manner it is possible in some cases to improve the quality of the connection between the components of the module and the data carrier body.

The data carrier can be covered with a protective layer on the side of the data carrier body where the display area of the display device is disposed, in order to protect the display device and optionally also the hereinabove described input device.

A suitable contact interface is e.g. a contact pad according to ISO/IEC 7816 or a USB interface. A suitable contactless interface is e.g. an antenna. With the contactless interface there is located at the place of the contact areas a cover, e.g. a tape, on which there can be e.g. an optical representation of a company logo. A suitable display device is e.g. a display or an LED or an array of LEDs. The data carrier body can possess the dimensions of a chip card according to ISO/IEC 7816.

BRIEF DESCRIPTION OF THE DRAWINGS

The invention will hereinafter be described by way of example with reference to the attached drawings. Therein are shown:

FIG. 2C the data carrier body from FIG. 2B in a plan view;

FIG. 3 a cross section of a first configuration of a second embodiment of the inventive module, inserted into a third configuration of an inventive data carrier body;

DETAILED DESCRIPTION OF EXEMPLARY EMBODIMENTS OF THE DISCLOSURE

Figure 1:
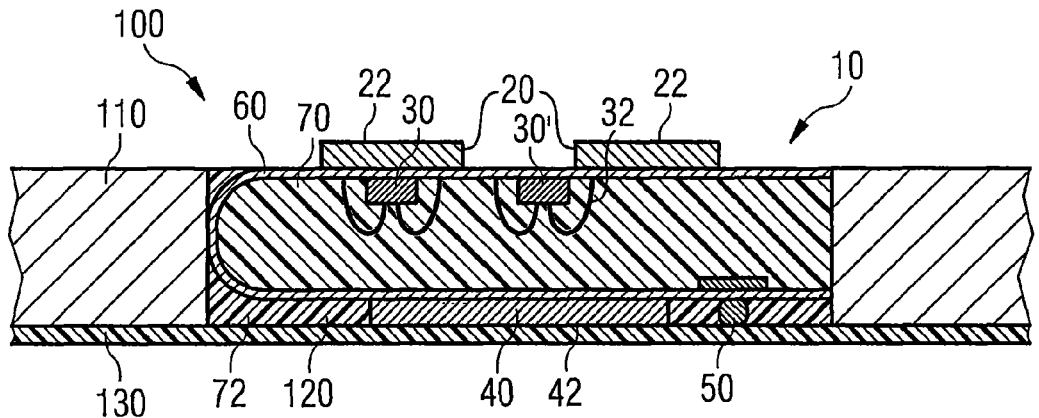
FIG. 1 a cross section of a first configuration of a first embodiment of an inventive module, inserted into a first configuration of an inventive data carrier body.

With reference to FIG. 1, a first configuration of a module 10 comprises a contact interface 20, integrated circuits 30 and 30', a display device 40, here in the form of a display, with display area 42, and an input device 50 in the form of an input button, the input device 50 being in principle optional. Said components are disposed on a flexible circuit board 60 and electronically interconnected into the module 10. The flexible circuit board 60 can be produced for example by means of a polyimide foil which permits the formation of especially fine copper paths. The circuits 30 and 30' are contacted to the contact areas 22 of the contact interface 20 by means of bonding wires 32. It is equally possible to electrically connect the circuits 30, 30' to the circuit board by means of the so-called flip-chip method. The electrically conductive connections of the components can be produced by wire bonding or soldering, e.g. by so-called solder bumps, or other suitable electrically conductive connections. The module 10 is potted by means of a potting material 70, thereby shaping the module 10 such that the contact areas 22 of the contact interface 20 and the display area 42 of the display 40 point in opposite directions.

The module 10 is inserted in the present exemplary embodiment into a through opening 120 of a flat data carrier body 110 which has been potted with potting material 72, as shown in FIG. 1, after insertion of the module 10. Basically, the module can also be inserted into a cavity which is milled out or produced by a corresponding production method of the card body. The data carrier body 110 with the inserted module 10 is designated as the data carrier 100. The opening 120 is milled into the data carrier body 110. It is also possible to leave out the opening 120 upon formation of the data carrier body 110 by means of injection molding. The side of the data carrier body 110 where the display 40 is disposed is covered with a transparent protective foil 130 in order to additionally protect the display 40 and the button 50. However, the foil 130 can also be absent. The protective foil 130 can also be a part of the data carrier body 110 and have an opening 120. The module 10 has a thickness such that the display 40 and the button 50, on the one side of the data carrier body 110, are level with the same, and the contact areas 22 of the contact interface 20 on the other side of the data carrier body 110 protrude slightly from the same to be able to be reliably contacted by suitable mating contacts of a contact reading device (not shown).

The integrated circuit 30 controls the data carrier 100 and is adapted to exchange data with an external contact reading device via the contact interface 20 and to process them. The circuit 30' controls the display 40. It is likewise possible that the circuit 30 also performs the control of the display 40, thereby permitting the circuit 30' to be omitted. The circuits 30 and 30' need not be located at the contact areas 22 but can also be located at the display 40. However, the electronics can also be simplified in such a manner that the display 40 is controlled exclusively by a contact reading device via the contact interface 20. A so-called "discrete component", i.e. a component consisting only of one circuit, is also designated as an integrated circuit within the scope of this invention, e.g. an LED. Moreover, it is possible that one or more further integrated circuits, i.e. also "discrete components", are disposed on the flexible circuit board 60, for example a crypto chip which is adapted specifically for decrypting and encrypting data.

The contact interface 20 is configured as a contact pad according to ISO/IEC 7816. Another configuration of the contact interface 20 is possible.

The input button 50 is used for manual inputting data to the data carrier 100. For this purpose, the button 50 is connected to the integrated circuit 30 and the display 40 via the circuit board 60. By actuating the button 50 a user of the data carrier 100 can initiate for example the generation of a one-time password in the circuit 30 and the displaying of the generated one-time password on the display 40. Further or alternative functions of the data carrier 100 can be selectable by means of the button 50. It is possible that the input device 50 provided is a plurality of buttons or the like. The button 50 is disposed in the module 10 on the same side as the display 40, i.e. opposite the contact interface 20. In this manner the user can view the display 40 while actuating the button 50. The arrangement of the display 40 in the described manner, i.e. on the side of the module 10 opposing the contact interface 20, makes it possible e.g. to read the display 40 while the data carrier 100 is contacted to a suitably adapted contact reading device (not shown), e.g. a chip card reader.

Figure 2A:
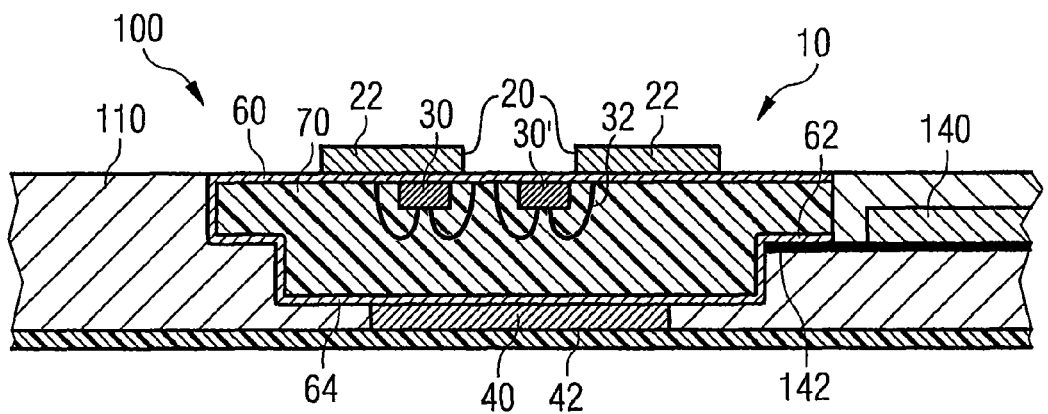
FIG. 2A a cross section of a second configuration of the first embodiment of the module, inserted into a second configuration of the data carrier body.
Figure 2B:
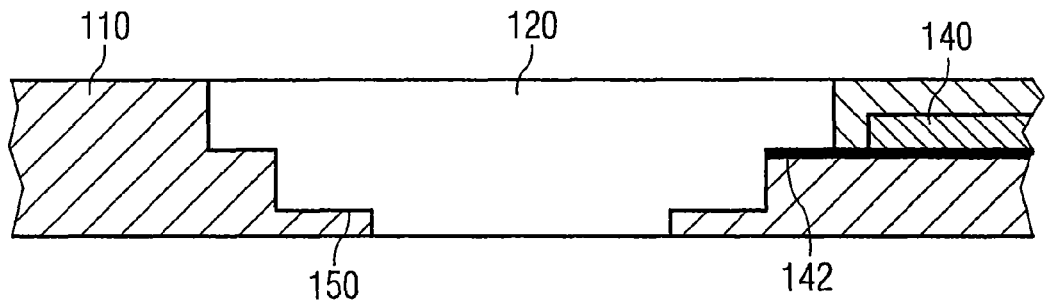
FIG. 2B the data carrier body from FIG. 2A in cross section without the inserted module.

In FIG. 2A there is shown a second configuration of the first embodiment of the module 10 with a flexible circuit board 60. FIGS. 2B and 2C show the corresponding data carrier body 110 without the module 10, whereby FIG. 2B shows a cross section along the line B-B of the data carrier body 110 represented in FIG. 2C in a plan view. Components that are identical with the components described in FIG. 1 are designated with the same reference signs and will not be described more closely here or hereinafter. The potting material 70 is stepped in the configuration illustrated in FIG. 2A. Accordingly, the through opening 120 (FIG. 2B) in the data carrier body 110 also possesses a stepped form. The module 10 is glued into the opening 120, whereby the steps 150 of the opening 120 serve as gluing areas. In this manner it is possible to attain a good compromise between the pliability of the data carrier body 110 and the reliability of the connection of the module 10 to the data carrier body 110.

The data carrier 100 further comprises an energy source, e.g. a battery 140 which is integrated into the data carrier body 110 in the form of a flat battery, or an accordingly large capacitor. Battery connectors 142 protrude into the opening 120 such that they are contacted by corresponding contacts 62 on the flexible circuit board 60. A further contact 64 on the circuit board 60 contacts a contactless interface 160 which has been applied to one of the steps 150 of the opening 120 in the form of an antenna coil and for its part has a mating contact 162 (FIG. 2C). For a contactless interface, two contacts are required.

FIG. 3 shows a first configuration of a second embodiment of the module 10, inserted into a data carrier body 110 according to a third configuration. The through opening 120 of the data carrier body 110 is stepped, as illustrated hereinabove in FIGS. 2A-2C. The module 10 comprises two circuit boards 60' and 60". The circuit boards 60', 60" can be produced e.g. from FR-4 material (glass fiber fabric bound with epoxy resin) as long as they are to have a certain stiffness and need not be too flexible. For production of a flexible circuit board there can be used e.g. a polyimide foil, as described hereinabove. On the first circuit board 60' there is applied e.g. the contact interface 20, and on the second circuit board 60" the integrated circuits 30 and 30' and the display 40. The circuit boards 60' and 60" are electronically contacted to each other e.g. by means of an anisotropic contact strip 200, whereby alternatively to the anisotropic contact strip 200 there can also be employed a silver paste. In a first procedural step the circuit board 60" is glued to the data carrier body 110 on a second step of the opening 120, and in a second procedural step the circuit board 60' on a first step of the opening 120.

Such an embodiment of the module 10 with two electronically interconnected circuit boards 60 and 60' can also be formed by means of a standard chip module and/or a standard display module, e.g. an LED module, which are electronically connected by means of the contact strip 200 or another suitable connection device, as explained hereinafter by way of example with reference to FIGS. 4 to 7B. The standard chip module on the first circuit board 60' comprises an integrated circuit 30 contacted to the contact interface 20 and then potted therewith, and the standard display module on the second circuit board 60" comprises apart from the display 40 e.g. also the integrated circuit 30' for controlling the display elements of the display 40.

Figure 4:
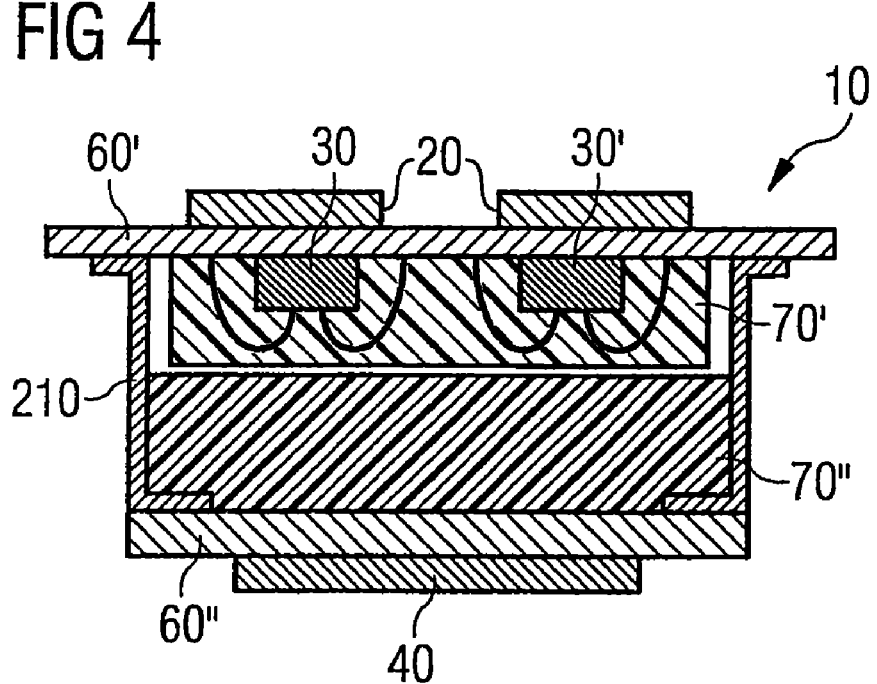
FIG. 4 a cross section of a second configuration of the second embodiment of the module.

With reference to FIG. 4, the module 10 according to a second configuration of the second embodiment again comprises two circuit boards 60' and 60". There are applied to the circuit board 60' the contact interface 20 and the integrated circuits 30 and 30' which are potted by means of a first potting material 70'. There is disposed on the second circuit board 60" in this configuration only the display 40. The circuit boards 60' and 60" are electronically interconnected by means of a wire grid 210. The wire grid is in its turn partly potted with a second potting material 70" and glued to the circuit boards 60', 60" by means of a conductive adhesive. It is also possible to solder or weld the circuit boards 60' and 60" to the wire grid 210.

Figure 5:
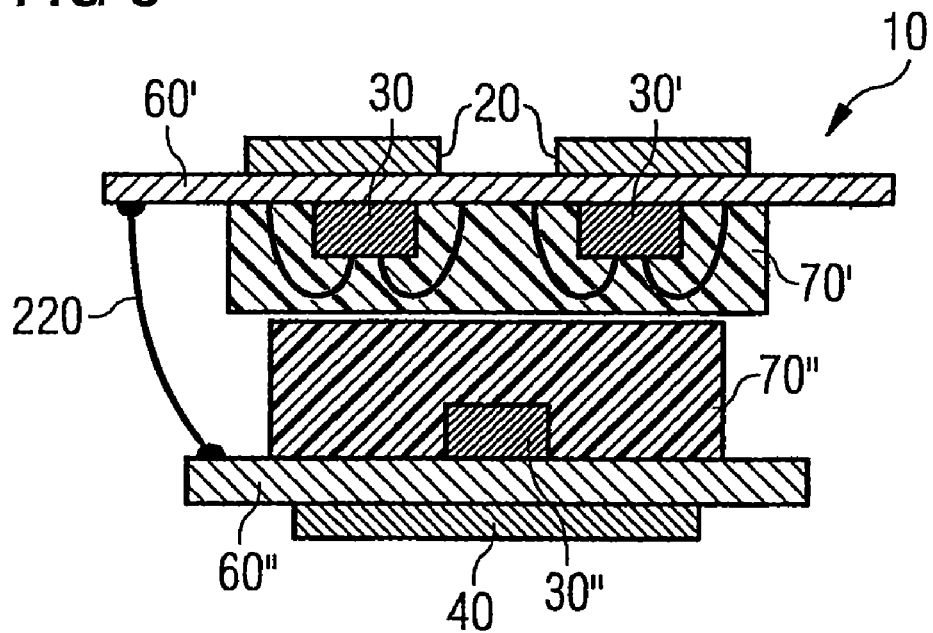
FIG. 5 a cross section of a third configuration of the second embodiment of the module.

FIG. 5 shows a third configuration of the second embodiment of the module 10 with the two circuit boards 60' and 60". The module 10 here comprises three integrated circuits 30, 30' and 30" which are distributed over the two circuit boards 60' and 60". The circuits 30, 30' and 30" are potted with potting materials 70' and 70" which have a plane surface. Alternatively to the plane surface there can also be provided fastening devices e.g. in the form of tongue and groove for fixing and positioning the potting materials 70' and 70". For example, a tongue of the potting material 70' could engage a groove of the potting material 70". In this manner it is possible to glue the potted circuit boards 60' and 60" together. This permits the circuit boards 60' and 60" to be suitably spaced, i.e. the module 10 then possesses a thickness corresponding substantially to a thickness of a data carrier body 110 into which the module 10 is to be inserted. The circuit boards 60' and 60" are electronically interconnected by means of bonding wires 220. It is also possible to pot the module 10 again after bonding in order to protect the bonding wires 220 and their contact points with the circuit boards 60' and 60".

Instead of potting with a potting material 70 it is also possible to dispose a container (not shown) filled with an adhesive or another, preferably liquid or doughy, material on one or both circuit boards 60', 60", the material inside the container surrounding the circuits disposed on the corresponding circuit board 60', 60" like the potting material 70', 70" therebefore.

Figure 6:
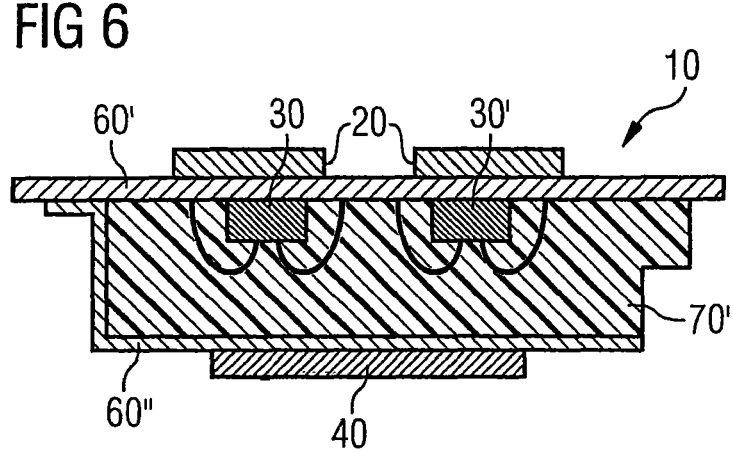
FIG. 6 a cross section of a fourth configuration of the second embodiment of the module.

FIG. 6 shows a fourth configuration of the second embodiment with the two circuit boards 60' and 60". Here only the first circuit board 60' is potted with a potting material 70' on the side where the integrated circuits 30 and 30' are disposed. The second circuit board 60" on which the display 40 is disposed is configured as a flexible circuit board 60" and electronically connected to the first circuit board 60' by soldering. It is also possible that the two circuit boards 60' and 60" are electroconductively glued or welded. Additionally, the second circuit board 60" is glued to the potting material 70' which has been suitably ground level, as described hereinabove. In this manner, too, the two circuit boards 60' and 60" can already, before insertion into a data carrier body, be disposed spatially relative to each other such that they are disposed on opposing sides of the module 10. The potting material 70' is stepped on one side, thereby facilitating a gluing of the module 10 upon insertion into a corresponding opening of a data carrier body 110. It is possible to shape the potting material 70' in beveled or also stepped fashion on the side where the two circuit boards 60' and 60" are connected, in order to simplify the connection of the circuit boards 60', 60".

Figure 7A:
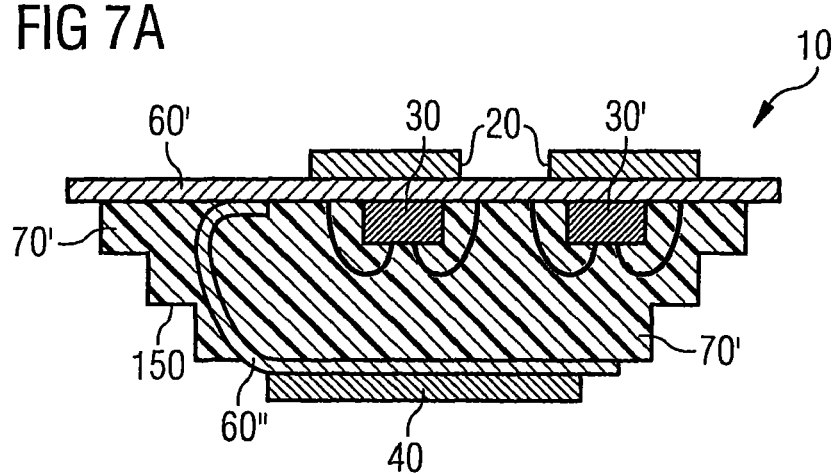
FIG. 7A a cross section of a fifth configuration of the second embodiment of the module.
Figure 7B:
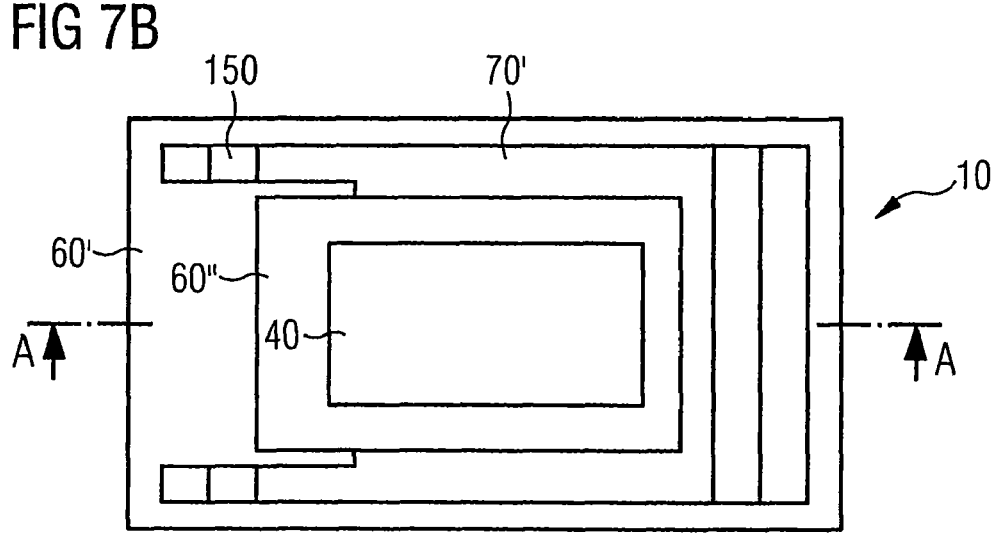
FIG. 7B the module from FIG. 7A in a bottom view.

With reference to FIGS. 7A and 7B, a fifth configuration of the embodiment with the two circuit boards 60' and 60" is represented. FIG. 7B shows a bottom view of the module 10 from FIG. 7A, and FIG. 7A shows a cross section along the line A-A from FIG. 7B. In contrast to the configuration in FIG. 6, the flexible circuit board 60" is coated on one side with copper contacts here. Feedthroughs as were necessary in the configuration from FIG. 6 can be avoided here. The potting material 70' is stepped on both sides. In principle there can also be no step present.

For all configurations of the second embodiment that have been described hereinabove with reference to FIGS. 3 to 7B, it holds that one of the two circuit boards 60', 60" can also be inserted into a corresponding data carrier body 110 before the circuit boards (60', 60") are electronically interconnected by means of one of the described devices. In this manner it is possible to resort to single components when producing the data carrier 100, and not to prefabricated modules wherein the circuit boards 60', 60" are already electronically connected. In some cases it is moreover possible to better guarantee a required reliability of the connection of the single components in the opening 120 of the data carrier body 110 to the data carrier body 110 when for example the circuit board 60" with the display 40 and the circuit board 60' with the contact interface 20 are glued into the opening 120 in separate procedural steps (FIG. 4). Gluing is done here on the steps.

Figure 8:
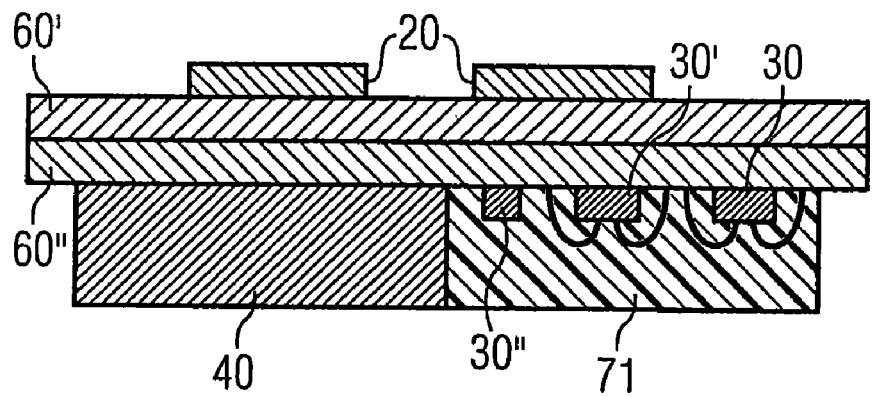
FIG. 8 a cross section of a sixth configuration of the second embodiment of the module.

With reference to FIG. 8, in a sixth configuration of the embodiment, the two circuit boards 60' and 60" are glued directly together or connected electronically in a different suitable manner. Basically, the two circuit boards 60' and 60" can also be produced by one circuit board. The circuits 30, 30', 30" are disposed on the same side of the circuit board 60" as the display 40. In the modules 10 according to the preceding configurations described with reference to FIGS. 1 to 7, the circuits 30, 30', 30" were always protected from the action of light by the contact interface 20 and the display 40, between which the circuits 30, 30', 30" were disposed. In the module from FIG. 8 the circuits 30, 30', 30" are potted for this purpose with a light-protective potting material 71 which at the same time ensures a plane surface of the module 10 on the side of the module 10 where the display 40 is disposed. In principle, the light-protective potting material 71 can be thinner than the display 40. Further, the light-protective potting material 71 can form a step, which has advantages for the assembly of the display 40.

Figure 9:
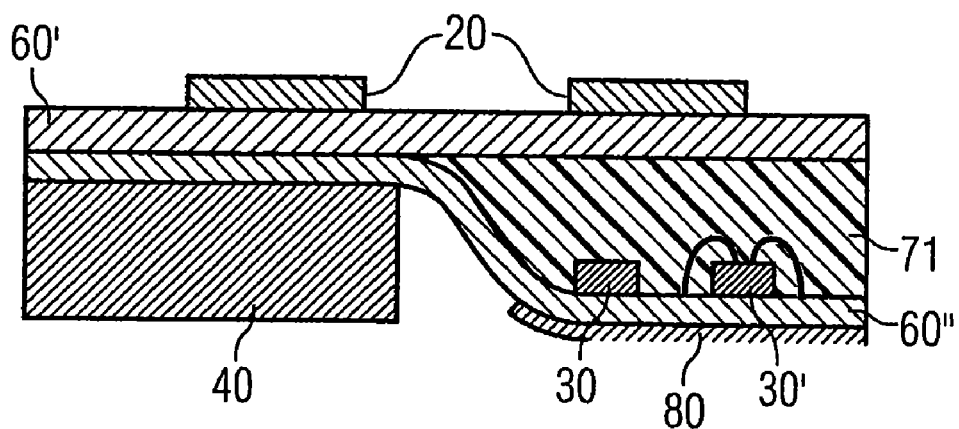
FIG. 9 a cross section of a seventh configuration of the second embodiment of the module.

In the module 10 which is represented in FIG. 9 the circuits 30, 30' are disposed on the circuit board 60" on the side opposite the display 40, but not behind the display 40 but rather therebeside, potted with a potting material 70" which can also be a light-protective potting material. To protect the circuits 30, 30' additionally from incident light, the flexible circuit board 60" is covered on the side opposite the circuits 30, 30' with a light-protective layer 80, e.g. in the form of a copper layer. Disposing the circuits 30, 30' on the circuit board 60" on the opposing side of the display 40 disposed on the circuit board 60" protects the display 40 additionally from damage when the circuits 30, 30' are e.g. soldered to the circuit board 60".

The invention claimed is:

1. A module for insertion into a data carrier body, comprising:
   a contact interface with a contact area,
   at least one integrated circuit, and
   a display device with a display area,
   wherein the contact interface, the at least one integrated circuit and the display device are connected so that the module is disposed in the data carrier body such that the contact area of the contact interface and the display area of the display device point in opposite directions, and
   wherein the module is potted by a potting material in a way such that the contact interface and the display device are disposed on mutually opposing sides of the potted module.

2. The module according to claim 1, wherein the module is configured as a flexible circuit board on which the contact interface, the at least one integrated circuit and the display device are electronically interconnected.

3. The module according to claim 1, wherein the module comprises two electronically interconnected circuit boards, there being disposed on a first one of the circuit boards the contact interface and there being disposed on a second one of the circuit boards the display device.

4. The module according to claim 3, wherein the module comprises exactly one integrated circuit which is disposed on the first circuit board.

5. The module according to claim 3, wherein the module comprises at least one integrated circuit, wherein at least one circuit is disposed on the first circuit board and/or at least one circuit on the second circuit board.

6. The module according to claim 5, wherein at least one of the circuits is disposed on the second circuit board on the same side as the display device, and potted by a light-protective potting material.

7. The module according to claim 5, wherein the second circuit board is covered with a light-protective layer on the opposing side of at least one circuit disposed on the second circuit board.

8. The module according to claim 3, wherein the first circuit board and the second circuit board are electronically connected
by an anisotropic contact strip contacting the two circuit boards; or
by a wire grid connected to the two circuit boards by a soldering, gluing or welding; or
by bonding wires.

9. The module according to claim 3, wherein at least one of the two circuit boards is configured flexibly and is electronically connected to the other circuit board by soldering, gluing or welding.

10. The module according to claim 3, including potting material which is disposed in the module such that the first circuit board and the second circuit board are disposable in the data carrier body so as to be spaced apart and/or disposed spatially relative to each other.

11. The module according to claim 10, wherein the first circuit board is potted with a first potting material on the opposing side of the contact interface disposed on the first circuit board, and/or the second circuit board is potted with a second potting material on the opposing side of the display device disposed on the second circuit board.

12. The module according to claim 10, wherein
the first potting material is glued to the second potting material, or
the second circuit board is configured flexibly and is glued to the first potting material, or
the first circuit board is configured flexibly and is glued to the second potting material.

13. The module according to claim 3, wherein one of the circuit boards comprise a contact for contacting a contactless interface and/or contacts for contacting battery connectors.

14. The module according to claim 1, wherein the potting material is shaped such that the potting material in a potted module or in a module disposed in the data carrier body between the contact interface and the display device is stepped.

15. The module according to claim 1, including an input device for manually inputting data, wherein the input device is electronically connected to the display device and the at least one integrated circuit, and the input device and the display device are disposable in a data carrier body such that the input device and the display area of the display device point in the same direction.

16. A flat data carrier body for receiving a module as recited in claim 1, comprising a through opening into which the module is insertable such that the contact interface and the display device are disposed on opposing sides of the data carrier body, and the contact area of the contact interface and the display area of the display device point in opposite directions.

17. The data carrier body according to claim 16, wherein the through opening is stepped.

18. The data carrier body according to claim 17, wherein on at least one step of the stepped opening there is applied a contactless interface in the form of an antenna coil such that it is contactable by a contact on one of the circuit boards of the module.

19. The data carrier body according to claim 16, including a battery which is integrated into the data carrier body, wherein connectors of the battery protrude into the through opening such that they are contactable with contacts on one of the circuit boards of the module.

20. A portable data carrier, comprising:
a module comprising a contact interface with a contact area, at least one integrated circuit and a display device with a display area, wherein the contact interface, the at least one integrated circuit and the display device are connected so that when the module is disposed in the portable data carrier, the contact area of the contact interface and the display area of the display device point in opposite directions; and
a flat data carrier body comprising a through opening into which a module is insertable such that when the module is inserted into the flat data carrier body, the contact area of the contact interface and the display area of the display device point in opposite directions.

21. The data carrier according to claim 20, wherein the side of the data carrier body where the display area of the display device is disposed is covered with a transparent protective foil.

22. A method for producing a module suitable for insertion into a data carrier body, comprising the step:
interconnecting at least one contact interface with a contact area, an integrated circuit and a display device with a display area in a module which is disposed in the data carrier body such that the contact area of the contact interface and the display area of the display device point in opposite directions, and
including potting the module using a potting material such that the contact interface and the display device are disposed on mutually opposing sides of the potted module.

23. The method according to claim 22, wherein the module is configured as a flexible circuit board on which the contact interface, at least one circuit and the display device are disposed such that they are electronically interconnected.

24. The method according to claim 22, including forming the module from two electronically interconnected circuit boards, wherein the contact interface is disposed on a first one of the circuit boards, and the display device is disposed on a second one of the circuit boards.

25. The method according to claim 24, including disposing exactly one integrated circuit on the first circuit board.

26. The method according to claim 24, including providing at least one circuit on the first circuit board, and/or at least one circuit on the second circuit board.

27. The method according to claim 26, including providing at least one of the circuits on the second circuit board on the same side as the display device and potted using a light-protective potting material.

28. The method according to claim 26, including covering the second circuit board with a light-protective layer on the opposing side of at least one circuit disposed on the second circuit board.

29. The method according to claim 24, including electronically connecting the first circuit board and the second circuit board by:
an anisotropic contact strip contacting the two circuit boards; or
a wire grid connected to the two circuit boards by soldering, gluing or welding; or
bonding wires.

30. The method according to claim 24, including supplying at least one of the two circuit boards in the form of a flexible circuit board and electronically connecting said at least one circuit board to the other circuit board by soldering, gluing or welding.

31. The method according to claim 24, including providing potting material in the module such that the first circuit board and the second circuit board are disposable in the data carrier body so as to be spaced apart and/or disposed spatially relative to each other.

32. The method according to claim 31, including potting the first circuit board with a first potting material on the opposing side of the contact interface disposed on the first circuit board, and/or potting the second circuit board with a second potting material on the opposing side of the display device disposed on the second circuit board.

33. The method according to claim 32, including:
gluing the first potting material to the second potting material; or
providing the second circuit board in the form of a flexible circuit board and gluing the flexible circuit board to the first potting material; or
providing the first circuit board in the form of a flexible circuit board and gluing the flexible circuit board to the second potting material.

34. The method according to claim 22, including shaping the potting material such that the potting material in a potted module or a module disposed in the data carrier body between the contact interface and the display device is stepped.

35. The method according to claim 22, including providing an input device for manually inputting data and electronically connecting the input device to the display device and the at least one integrated circuit and arranged such that the input device and the display device are disposed in the data carrier body such that the display area of the display device and the input device point in the same direction.

36. The method according to claim 22, including configuring one of the circuit boards such that on the one circuit board there are supplied a contact for contacting a contactless interface and/or contacts for contacting battery connectors.

37. A method for producing a flat data carrier body with an opening for receiving a module produced in the manner recited in claim 22, wherein the opening is configured as a through opening such that the contact interface and the display device of the module are disposable on mutually opposing sides of the data carrier body such that the contact area of the contact interface and the display area of the display device point in opposite directions.

38. The method according to claim 37, including forming the through opening as stepped.

39. The method according to claim 38, including applying on at least one of the steps of the stepped opening there is applied a contactless interface in the form of an antenna coil which is contactable by at least one of the circuits.

40. The method according to claim 37, including integrating a battery into the data carrier body such that connectors of the battery protrude into the through opening such that the at least one circuit and/or the display device are contactable with the connectors of the battery.

41. A method for producing a portable data carrier, comprising the steps of:
supplying a module comprising a contact interface with a contact area, at least one integrated circuit and a display device with a display area;
supplying a flat data carrier body for receiving the module, said flat data carrier body comprising a through opening into which the module is insertable such that the contact interface and the display device of the module are disposed on opposing sides of the flat data carrier body when the module is inserted into the flat data carrier body
interconnecting the contact interface, the at least one circuit and the display device into the module so that the contact interface, the at least one integrated circuit, and the display device are connected, wherein the module is disposed in the data carrier body such that the contact area of the contact interface and the display area of the display device point in opposite directions; and
disposing the contact interface, the at least one circuit and the display device in the through opening of the data carrier body;
arranging the contact interface and the display device in the opening on opposing sides of the data carrier body such that the contact area of the contact interface and the display area of the display device point in opposite directions.

42. The method according to claim 41, wherein, disposing of the contact interface and/or the display device in the opening of the data carrier body is carried out before the connecting of the contact interface to the display device.

43. The method according to claim 41, wherein, disposing of the contact interface and/or the display device in the opening of the data carrier body is carried out after the connecting of the contact interface to the display device.

44. The method according to claim 41, including covering the side of the data carrier body where the display area of the display device is disposed with a transparent protective foil.

* * * * *